United States Patent [19]

Iguchi et al.

[11] Patent Number: 5,060,531

[45] Date of Patent: Oct. 29, 1991

[54] SCREW ROTOR

[75] Inventors: Yuichi Iguchi; Koji Tani, both of Tokyo, Japan

[73] Assignee: Ishikawajima-Harima Jukogyo Kabushiki Kaisha, Tokyo, Japan

[21] Appl. No.: 451,759

[22] Filed: Dec. 18, 1989

[30] Foreign Application Priority Data

Jan. 10, 1989 [JP] Japan .............................. 1-1417[U]

[51] Int. Cl.[5] ........................ F04C 18/16; F16H 1/08

[52] U.S. Cl. ................................ 74/424.5; 74/424.7; 74/DIG. 10; 418/178

[58] Field of Search ........... 74/DIG. 10, 424.5, 424.7; 418/178

[56] References Cited

U.S. PATENT DOCUMENTS 3,071,314 11/1959 Flanagan ........................ 418/178 X
4,671,751 6/1987 Kasuya et al. ................ 74/424.7 X
4,695,233 10/1987 Miyoshi et al. ............... 74/424.5 X

FOREIGN PATENT DOCUMENTS 142218 10/1977 Japan .
56-75992 6/1981 Japan ................................ 418/178
58-148292 10/1983 Japan ................................ 418/178
61-197788 10/1986 Japan ................................ 418/178
0369295 4/1973 U.S.S.R. ............................ 418/178

*Primary Examiner*—Allan D. Herrmann
*Assistant Examiner*—J. Krolikowski

[57] ABSTRACT

One of male and female rotor elements is coated with a coating which is different in hardness from the other uncoated element. Even when the rotor elements come to contact with each other during the operation due to thermal expansion or the like, because of the difference in hardness between the coating and the other uncoated element, either of them which has a less degree of hardness is scraped off. As a result, accident due to contact between the male and female rotor elements can be prevented and the screw rotor can be operated with an optimum clearance between the elements.

1 Claim, 1 Drawing Sheet

SCREW ROTOR

BACKGROUND OF THE INVENTION

The present invention relates to a screw rotor used as an air compressor or the like.

Referring first to FIG. 1, a conventional screw rotor generally represented by reference numeral 5 comprises male and female rotor elements 3 and 4 rotatable around parallel axes 1 and 2, respectively. The male element 3 is of clover-like cross section and had three ridge portions 6 extending helically in the axial direction while the female rotor element 4 has valley portions 7 extending helically in the axial direction and engaged with the ridge portions 6. The ridge and valley portions 6 and 7 are so designed and constructed that they engage with each other like intermeshing gears to leave a small clearance between each ridge portion 6 and its corresponding valley portion 7.

In using the screw rotor 5 as, for instance, an air compressor, the elements 3 and 4 are rotated by drive means (not shown) in the direction indicated by the arrows to compress and feed the air in the valley portions 7 rearward in the axial direction, as indicated by a white arrow, in a casing (not shown) housing therein the elements 3 and 4.

FIG. 2 illustrates a front view of the screw rotor 5. As described above, small clearance is defined at 8 between the elements 3 and 4. To narrow the clearance will contribute to enhancement of air compression efficiency, but is disadvantageous in that danger of contact between the elements 3 and 4 due to, say, thermal expansion of the same will be increased. In order to overcome this problem, so far the male and female elements 3 and 4 are applied with polytetrafluoroethylene (known as Teflon®) at 9 in the thickness of tens microns, thereby narrowing the clearnace between the ridge and valley portions. As a result, even when the elements 3 and 4 are caused to contact with each other due to thermal expansion thereof or the like, only the coatings 9 are separated off from the elements 3 and 4. Therefore any accident such as breakdown due to thermal welding between the metallic elements 3 and 4 can be avoided.

Such application of the coatings 9 to the elements 3 and 4 has difficulty in setting the thickness of each coating 9, resulting in tendency of the coatings with a low degree of accuracy. There arises a further problem that the coatings 9, which are made from the same material, tend to weld together upon contact with each other and each coating 9 is substantially separated from the elements 3 and 4, resulting in difficulty in defining an optimum clearance between the ridge and valley portions of the elements 3 and 4.

In view of the above, a primary object of the present invention is to provide a screw rotor which can prevent a pair of rotor elements from contacting with each other and which can operate with leaving an optimum clearance between the elements.

The above and other objects, effects and features of the present invention will become more apparent from the following preferred embodiment of the present invention taken in conjunction with the accompanying drawings.

BRIEF DESCRIPTION OF THE DRAWINGS

The same reference numerals are used to designate similar parts throughout the figures.

DETAILED DESCRIPTION OF THE PREFERRED EMBODIMENT

Figure 1:
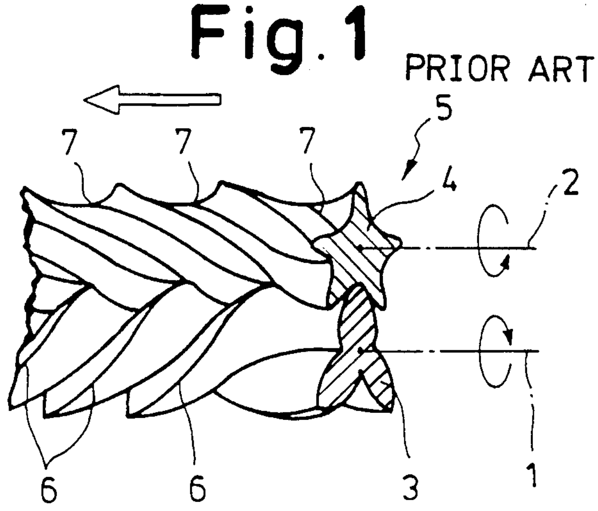
Fig. 1 PRIOR ART
FIG. 1 is a perspective view illustrating a conventional screw rotor.
Figure 2:
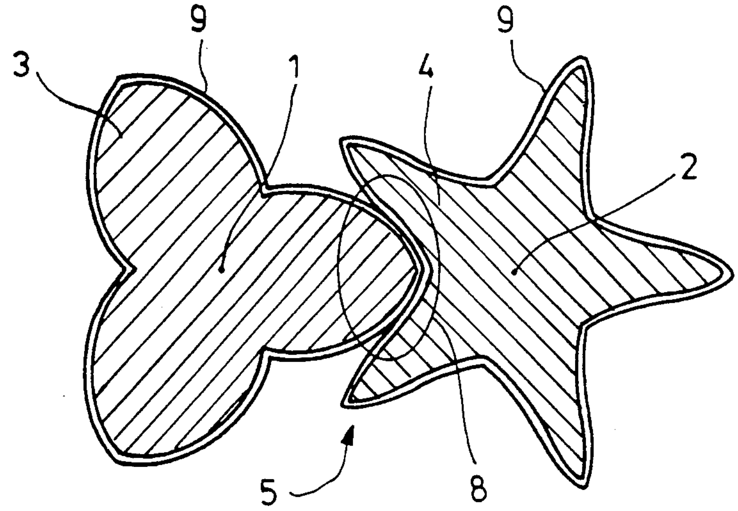
Fig. 2 PRIOR ART
FIG. 2 is a front view thereof.
Figure 3:
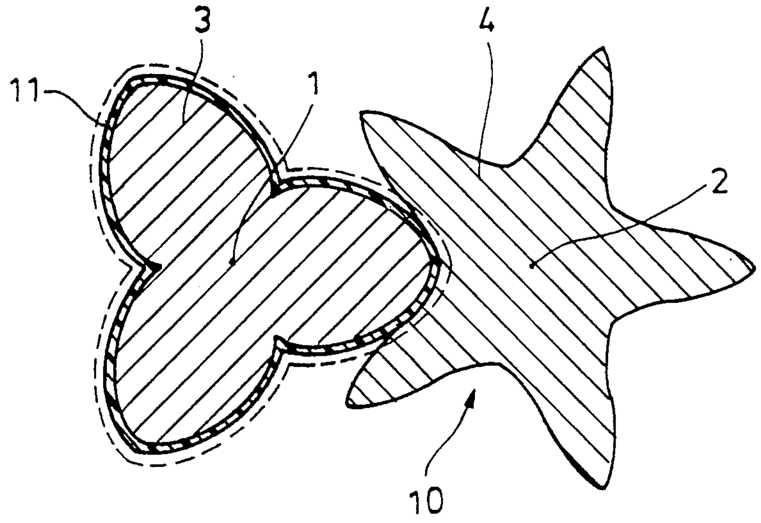
FIG. 3 is a front view of a preferred embodiment of the present invention.

A preferred embodiment of the present invention as shown in FIG. 3 is substantially similar in construction to the above-described conventional screw rotor except that only one of the rotor elements 3 and 4 (the male element 3 in the drawings) is relatively thickly coated with polytetrafluoroethylene or the like with the depth of one hundred microns as indicated by the broken lines. The material is coated and then machined with a high degree of accuracy to provide a machined coating 11 which permits the elements 3 and 4 to engage with each other with an optimum clearance. The elements 3 and 4 are engaged with each other and rotated about the axes 1 and 2, respectively. Thus, a screw rotor generally represented by 10 is provided.

According to the screw rotor 10, the machined coating 11 permits the male and female rotor elements 3 and 4 to operate with an optimum clearance therebetween so that when the elements 3 and 4 are rotated by drive means (not shown), they coact to compress the air with a high degree of efficiency.

During the operation, even if the elements 3 and 4 come to contact with each other due to thermal expansion of the same or the like, only a contacted portion of the coating 11 on the element 3 is readily scraped off since the coating 11 has less hardness than that of the uncoated element 4, thereby naturally defining an optimum clearance. Thus the coating 11 with the thickness of hundreds microns can prevent the contact of the elements 3 and 4 beforehand.

It is to be noted that the female rotor element 4 may be applied with a coating instead of the male rotor element 3. In other words, only one of the elements 3 and 4 is applied with a coating.

Instead of polytetrafluoroethylene, any other heat-resisting material may be used which are similar in thermal expansion coefficient to the metallic rotor element to be coated and has substantially different in hardness from the uncoated metallic rotor element. In applying the material onto a rotor element, metal-vapor plating, spray coating or the like may be used.

It follows therefore that the present invention covers a screw rotor having a rotor element with a film of metal which is harder than the other uncoated rotor element. Then, unlike the preferred embodiment as described above, the contacted portion of the uncoated rotor element is scraped off to maintain an optimum clearance between the elements 3 and 4.

Anyway, breakdown due to contact between the male and female rotor elements can be prevented beforehand and the screw rotor can be operated with an optimum clearance between the ridge and valley portions of the male and female rotor elements.

Since only one of the rotor elements is applied with a coating and said coating is machined after application onto the corresponding element, setting or defining clearance between the rotor elements is much facilitated and the screw rotor can be fabricated at inexpensive costs.

As described above, with the screw rotor according to the present invention, breakdown of the male and female rotor elements due to contact therebetween can be prevented beforehand and the screw rotor can be operated with an optimum clearance between the elements. The clearance between the elements can be readily set as compared with the conventional screw rotors and the screw rotor can be fabricated by less costs.

We claim:

1. In a screw rotor wherein a male rotor element having ridge portions helically extending in an axial direction and a female rotor element having valley portions helically extending in the axial direction are rotatably engaged with each other while leaving a small clearance therebetween, an improvement comprising a coating made from polytetraflurethylene on one of said elements and made from heat-resisting material which is substantially similar in thermal expansion coefficient to said one element and is substantially different in hardness to the other uncoated element, said coating of polytetrafluoethylene being machined after applied to said one element and being scraped off by said other uncoated element to provide an optimum clearance.

* * * * *